(12) United States Patent
Yoshimura

(10) Patent No.: US 9,744,851 B2
(45) Date of Patent: Aug. 29, 2017

(54) TRANSFER FOR FOUR-WHEEL DRIVE VEHICLE

(71) Applicant: TOYOTA JIDOSHA KABUSHIKI KAISHA, Toyota-shi, Aichi-ken (JP)

(72) Inventor: Takahiro Yoshimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/125,061

(22) PCT Filed: Mar. 24, 2015

(86) PCT No.: PCT/IB2015/000389
§ 371 (c)(1),
(2) Date: Sep. 9, 2016

(87) PCT Pub. No.: WO2015/145241
PCT Pub. Date: Oct. 1, 2015

(65) Prior Publication Data
US 2017/0015195 A1    Jan. 19, 2017

(30) Foreign Application Priority Data

Mar. 25, 2014 (JP) ................................ 2014-061677
Jan. 30, 2015 (JP) ................................ 2015-017546

(51) Int. Cl.
*B60K 17/344* (2006.01)
*B60K 23/08* (2006.01)
(Continued)

(52) U.S. Cl.
CPC ............ *B60K 17/344* (2013.01); *B60K 17/35* (2013.01); *B60K 23/08* (2013.01); *F16D 27/10* (2013.01);
(Continued)

(58) Field of Classification Search
CPC ...... B60K 17/344; B60K 17/35; B60K 23/08; B60K 17/348; F16D 27/10; F16D 41/185; F16D 2500/1022
See application file for complete search history.

(56) References Cited

U.S. PATENT DOCUMENTS

| | | | |
|---|---|---|---|
| 8,042,642 | B2 | 10/2011 | Marsh et al. |
| 8,047,323 | B2 | 11/2011 | Downs et al. |

(Continued)

FOREIGN PATENT DOCUMENTS

| | | |
|---|---|---|
| JP | 2012-193779 A | 10/2012 |
| WO | 2010/104853 A2 | 9/2010 |
| WO | 2012/145580 A1 | 10/2012 |

*Primary Examiner* — Kevin Hurley
*Assistant Examiner* — Michael Stabley
(74) *Attorney, Agent, or Firm* — Oliff PLC

(57) ABSTRACT

A transfer for a four-wheel drive vehicle, the vehicle including a driving source, main/auxiliary drive wheels, and a power transmission member, the transfer includes: a ring gear being supported so as to rotate around a rotation axis, and configured to drive the power transmission member; an input shaft extending through an inside of the ring gear, being supported so as to rotate concentrically with the ring gear, and being configured to receive part of the driving force; a disconnect mechanism; and an actuator configured to change the disconnect mechanism between a connection position and a disconnection position, the connection position being a position at which the ring gear and the input shaft are coupled to each other so as not to relatively rotate, the disconnection position being a position at which relative rotation between the ring gear and the input shaft is allowed.

6 Claims, 4 Drawing Sheets

(51) Int. Cl.
  *F16D 41/18* (2006.01)
  *B60K 17/35* (2006.01)
  *F16D 48/06* (2006.01)
  *F16D 27/10* (2006.01)
  *F16D 27/14* (2006.01)
  *B60K 17/348* (2006.01)

(52) U.S. Cl.
  CPC ........... *F16D 27/14* (2013.01); *F16D 41/185* (2013.01); *F16D 48/06* (2013.01); *B60K 17/348* (2013.01); *F16D 2500/1022* (2013.01); *F16D 2500/10431* (2013.01); *F16D 2500/50615* (2013.01); *F16D 2500/7041* (2013.01)

(56) References Cited

U.S. PATENT DOCUMENTS

| | | | |
|---|---|---|---|
| 8,177,672 B2* | 5/2012 | Kato | B60K 17/344 475/198 |
| 8,313,407 B2 | 11/2012 | Ekonen et al. | |
| 8,469,854 B1* | 6/2013 | Downs | B60K 23/08 475/221 |
| 8,795,126 B2* | 8/2014 | Downs | F16H 48/22 475/201 |
| 2006/0283654 A1* | 12/2006 | Krisher | B60K 17/20 180/354 |
| 2010/0044138 A1 | 2/2010 | Marsh et al. | |
| 2012/0325030 A1 | 12/2012 | Kinsey et al. | |

* cited by examiner

TRANSFER FOR FOUR-WHEEL DRIVE VEHICLE

BACKGROUND OF THE INVENTION

1. Field of the Invention

The invention relates to a technique for reducing the size of a transfer for a four-wheel drive vehicle.

2. Description of Related Art

U.S. Pat. No. 8,042,642 discloses a four-wheel drive vehicle in which a two-wheel drive mode or a four-wheel drive mode is selectively carried out. In the two-wheel drive mode, driving force is transmitted from a driving source to right and left main drive wheels. In the four-wheel drive mode, driving force is transmitted from the driving source to the right and left main drive wheels and right and left auxiliary drive wheels. In U.S. Pat. No. 8,042,642, a transfer for a four-wheel drive vehicle is used to output part of driving force, which is transmitted from the driving source to the right and left main drive wheels, to the right and left auxiliary drive wheels via a power transmission member, when the drive mode is changed from the two-wheel drive mode to the four-wheel drive mode.

The transfer for a four-wheel drive vehicle, which is described in U.S. Pat. No. 8,042,642, includes a ring gear, an input shaft and a disconnect mechanism. The ring gear is used to drive the power transmission member. The power transmission member is, for example, a propeller shaft. The input shaft receives part of driving force that is transmitted from the driving source to the right and left main drive wheels. The disconnect mechanism connects the input shaft to the ring gear or disconnects the input shaft from the ring gear. In the transfer for a four-wheel drive vehicle, the input shaft is released from the ring gear by the disconnect mechanism in the two-wheel drive mode, whereas the input shaft is connected to the ring gear by the disconnect mechanism in the four-wheel drive mode.

SUMMARY OF THE INVENTION

In the above-described transfer for a four-wheel drive vehicle, there is an inconvenience that the size of the transfer increases because of the ring gear, input shaft, disconnect mechanism, and the like, provided in the transfer. For example, the transfer for a four-wheel drive vehicle, which is described in U.S. Pat. No. 8,042,642, has a biaxial configuration that the rotation axis of the ring gear and the rotation axis of the input shaft are distanced from each other. Because of the distanced rotation axes of those ring gear and input shaft, the size of the transfer in a direction perpendicular to the rotation axis of the ring gear increases.

The invention provides a transfer for a four-wheel drive vehicle, which is reduced in size.

An aspect of the invention provides a transfer for a four-wheel drive vehicle. The four-wheel drive vehicle includes a driving source, right and left main drive wheels, a power transmission member, and right and left auxiliary drive wheels. The transfer is configured to output part of driving force, which is transmitted from the driving source to the main drive wheels, to the auxiliary drive wheels via the power transmission member when a drive mode of the four-wheel drive vehicle has been changed from a two-wheel drive mode to a four-wheel drive mode. The transfer includes a ring gear, an input shaft, a disconnect mechanism and an actuator. The ring gear has a cylindrical shape. The ring gear is supported so as to rotate around a rotation axis. The ring gear is configured to drive the power transmission member. The input shaft extends through an inside of the ring gear. The input shaft is supported so as to rotate concentrically with the ring gear. The input shaft is configured to receive part of driving force that is transmitted from the driving source to the main drive wheels. The disconnect mechanism is configured to connect the ring gear to the input shaft and disconnect the ring gear from the input shaft. The actuator is configured to change the disconnect mechanism between a connection position and a disconnection position. The connection position is a position at which the ring gear and the input shaft are coupled to each other so as not to relatively rotate. The disconnection position is a position at which relative rotation between the ring gear and the input shaft is allowed.

According to the above aspect, the input shaft extends through the inside of the ring gear, and is supported so as to rotate concentrically with the ring gear. Thus, the rotation axis of the input shaft and the rotation axis of the ring gear are suitably close to each other, and the size of the transfer in a direction perpendicular to the rotation axis of the ring gear is suitably reduced. Therefore, it is possible to reduce the size of the transfer as compared to an existing transfer.

In the above aspect, both ends of the input shaft may be supported by a pair of bearings provided inside a case such that the input shaft rotates concentrically with the ring gear. The disconnect mechanism may be arranged between the pair of bearings. According to the above aspect, the arrangement position of the disconnect mechanism in the direction of the rotation axis of the ring gear is determined in the transfer, and the size of the transfer in the direction of the rotation axis of the ring gear is reduced.

In the above aspect, the power transmission member may be a propeller shaft configured to transmit power toward the auxiliary drive wheels. The actuator may include a trip mechanism and an electromagnet. The trip mechanism and the electromagnet may be configured to change the disconnect mechanism between the connection position and the disconnection position. The trip mechanism and the electromagnet may be arranged on the same side as the ring gear with respect to an axis of the propeller shaft. According to the above aspect, the arrangement positions of the trip mechanism and electromagnet of the actuator in the transfer are suitably close to the ring gear, so it is possible to further reduce the size of the transfer.

In the above aspect, the disconnect mechanism may be an intermesh disconnect mechanism. The disconnect mechanism may include first teeth and a movable meshing member. The first teeth may be provided on the ring gear. The movable meshing member may include second teeth configured to be engaged with or released from the first teeth. The movable meshing member may be provided on the input shaft so as not to relatively rotate and so as to move in a direction of the rotation axis. The actuator may be configured to move the movable meshing member between the connection position and the disconnection position by using an electromagnet. According to the above aspect, for example, in comparison with a configuration that a controlled coupling is provided between the ring gear and the input shaft, co-rotation of the ring gear resulting from rotation of the input shaft is prevented when the movable meshing member has been moved to the disconnection position by the actuator. For example, U.S. Pat. No. 8,313, 407 suggests a configuration that a transfer is formed of a dog clutch (intermesh disconnect mechanism). However, when the intermesh disconnect mechanism is provided between the ring gear and the input shaft, it is possible to reduce the size of the transfer formed of the intermesh disconnect mechanism as compared to the existing transfer.

In the above aspect, the actuator may include a spring and a trip mechanism. The spring may be configured to urge the movable meshing member from the disconnection position toward the connection position. The trip mechanism may include a first piston, a second piston and a holder. The first piston may be configured to be reciprocated by the electromagnet in the direction of the rotation axis by a predetermined stroke. The second piston may be provided so as to relatively rotate with respect to the input shaft and may be moved by the first piston against an urging force of the spring. The holder may have multi-step latch teeth and may be provided on the input shaft so as not to relatively rotate or move in the direction of the rotation axis. The holder may be configured to latch the second piston, moved by the first piston, with any one of the multi-step latch teeth. The trip mechanism may be configured to cause the second piston to move the movable meshing member to the disconnection position against the urging force of the spring by a predetermined number of times of reciprocating stroke of the first piston. The trip mechanism may be configured to, when the number of times of reciprocating stroke exceeds the predetermined number of times, unlatch the second piston and allow the movable meshing member to move to the connection position under the urging force of the spring. According to the above aspect, by latching the second piston to the latch teeth of the holder with the use of the trip mechanism, it is possible to mechanically position the movable meshing member at the disconnection position or at the connection position and fix the position of the movable meshing member. Thus, for example, in comparison with a configuration that electric power is used to fix the position of the movable meshing member at the disconnection position or at the connection position, it is possible to suitably suppress an electric power consumption that is used in the transfer. In U.S. Pat. No. 8,042,642, in a transfer having no torque-stroke amplification mechanism, such as the trip mechanism, the size of a solenoid provided in the transfer increases, and, for example, the solenoid protrudes from the end face of a bearing, supporting the input shaft, toward a wheel, with the result that the size of the transfer in the direction of the rotation axis of the ring gear increases. However, by providing the trip mechanism, it is possible to suitably reduce the size of the transfer in the direction of the rotation axis of the ring gear.

In the above aspect, the transfer may further include a ball cam arranged between the electromagnet and the trip mechanism. The ball cam may include an annular member and spherical rolling elements. The annular member may be arranged in a state where the annular member overlaps with the first piston of the trip mechanism in the direction of the rotation axis. The spherical rolling elements may be sandwiched by a pair of mutually facing cam faces respectively formed on the annular member and the first piston. The ball cam may be configured to space the annular member and the first piston apart from each other when the annular member and the first piston are relatively rotated. The movable meshing member may be configured to be moved in the direction of the rotation axis by the ball cam via the trip mechanism when braking torque is transmitted to the annular member by the electromagnet and then the annular member and the first piston relatively rotate. According to the above aspect, for example, in comparison with a configuration that the movable meshing member is reciprocated by a predetermined stroke by attracting the movable piece by using the electromagnet, it is possible to suitable elongate the stroke of the movable meshing member by using the ball cam.

In the above aspect, the transfer may further include a synchronizer arranged between the movable meshing member and the trip mechanism inside the ring gear. The synchronizer may include an input shaft-side friction engagement member and a ring gear-side friction engagement member. The input shaft-side friction engagement member may be provided on the input shaft so as not to relatively rotate. The ring gear-side friction engagement member may be provided on the ring gear so as not to relatively rotate and so as to move in the direction of the rotation axis together with the movable meshing member. The synchronizer may be configured to synchronize rotation of the ring gear with rotation of the input shaft by causing the input shaft-side friction engagement member and the ring gear-side friction engagement member to be in sliding contact with each other before the movable meshing member is moved to the connection position. According to the above aspect, the synchronizer is arranged between the movable meshing member and the trip mechanism on the radially inner side of the cylindrical ring gear. Thus, it is possible to suitably reduce the size of the transfer in the direction of the rotation axis of the ring gear. In U.S. Pat. No. 8,042,642, if a synchronization mechanism (synchronizer) is further added to the transfer, the size of the transfer in the direction of the rotation axis of the ring gear increases. However, by arranging the synchronizer between the movable meshing member and the trip mechanism on the radially inner side of the cylindrical ring gear, it is possible to suitably reduce the size of the transfer in the direction of the rotation axis of the ring gear.

In the above aspect, part of the movable meshing member may be arranged between the ring gear and a portion of the input shaft, and the portion of the input shaft may correspond to a range of an axial length of the ring gear. According to the above aspect, the size of the transfer in the direction of the rotation axis of the ring gear is suitably reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. In the following embodiment, the drawings are modified or simplified where appropriate, and the scale ratio, shape, and the like, of each portion are not always drawn accurately.

Figure 1:
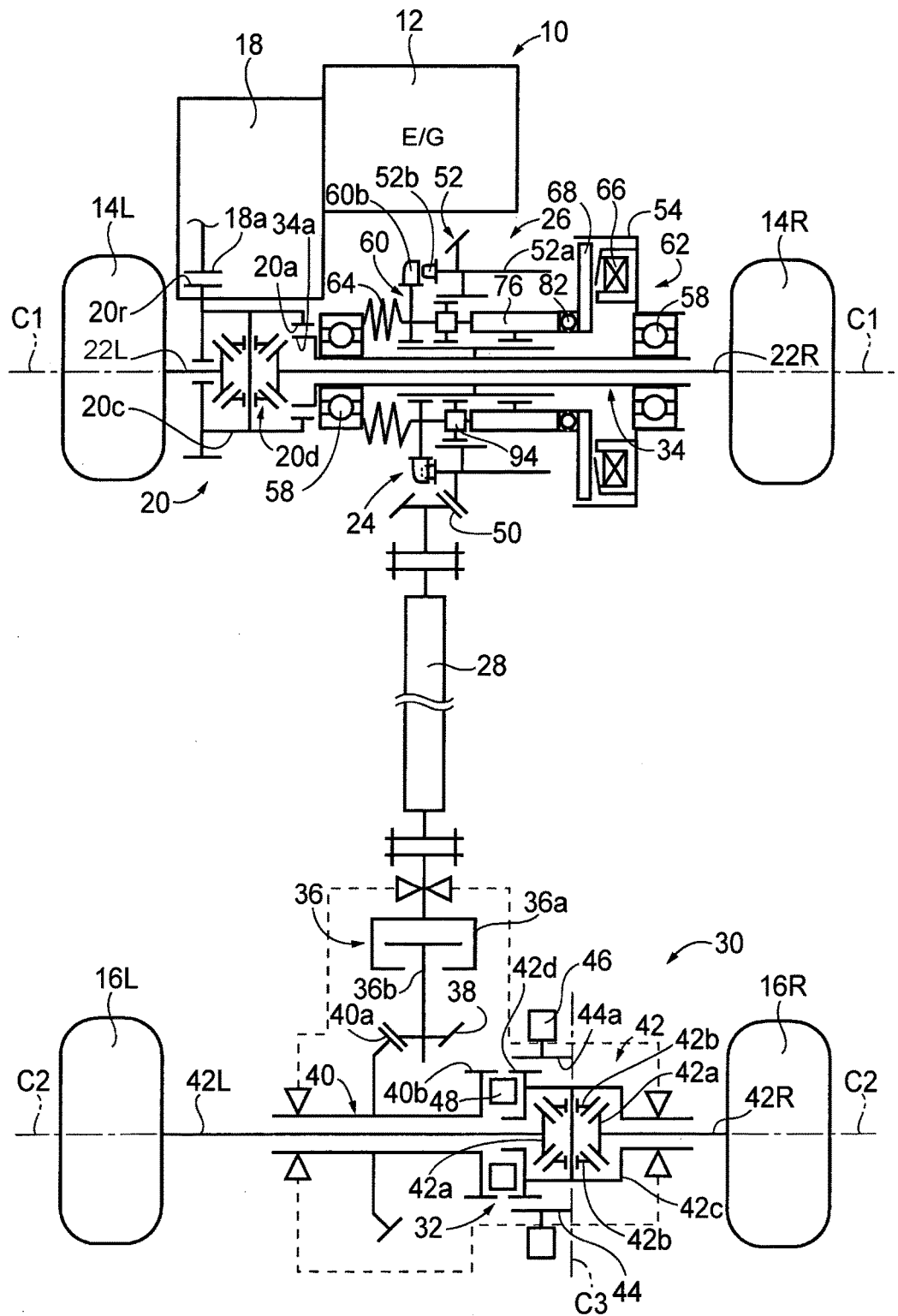
FIG. 1 is a skeletal view that schematically illustrates the configuration of a four-wheel drive vehicle to which the invention is suitably applied.

FIG. 1 is a skeletal view that schematically illustrates the configuration of a four-wheel drive vehicle 10 to which the invention is suitably applied. As shown in FIG. 1, the four-wheel drive vehicle 10 uses an engine 12 as a driving source, and includes a four-wheel drive system including a first power transmission path and a second power transmission path. The first power transmission path transmits power of the engine 12 to right and left front wheels 14R, 14L corresponding to main drive wheels. The right and left front wheels 14R, 14L are referred to as the front wheels 14 unless specifically distinguished from each other. The second power transmission path transmits power of the engine 12 to right and left rear wheels 16R, 16L corresponding to auxiliary drive wheels. The right and left rear wheels 16R, 16L are referred to as the rear wheels 16 unless specifically distinguished from each other. The four-wheel drive vehicle 10 includes an FF-base (front-engine, front-wheel drive layout-base) four-wheel drive system. In a two-wheel drive mode of the four-wheel drive vehicle 10, driving force transmitted from the engine 12 via an automatic transmission 18 is transmitted to the right and left front wheels 14R, 14L via a front wheel driving force distribution unit 20 and right and left axles 22R, 22L. In the two-wheel drive mode, at least a first clutch 24 provided in a transfer 26 is released. Thus, in the two-wheel drive mode, power is not transmitted to a propeller shaft (power transmission member) 28, a rear wheel driving force distribution unit 30, or the rear wheels 16. In a four-wheel drive mode, in addition to the two-wheel drive mode, the first clutch 24 and a second clutch 32 both are engaged. Thus, in the four-wheel drive mode, driving force from the engine 12 is transmitted to the propeller shaft 28, the rear wheel driving force distribution unit 30 and the rear wheels 16. Although not shown in FIG. 1, a torque converter or a clutch is provided between the engine 12 and the automatic transmission 18. The torque converter is a fluid transmission device.

The automatic transmission 18 is, for example a stepped automatic transmission. The stepped automatic transmission includes a plurality of planetary gear trains and friction engagement devices (a clutch and a brake). A speed position of the stepped automatic transmission is selected by selectively engaging those friction engagement devices. Alternatively, the automatic transmission 18 may be a stepped automatic transmission in which a speed position of a constant mesh parallel shaft transmission is selected by a shift actuator and a select actuator. Alternatively, the automatic transmission 18 may be a continuously variable transmission of which a speed ratio is continuously changed by changing the effective diameters of a pair of variable pulleys having variable effective diameters and around which a transmission belt is wound. Because the automatic transmission 18 is a known technique, the description of specific structure and operation is omitted.

The front wheel driving force distribution unit 20 includes a ring gear 20r, a differential case 20c, and a differential gear mechanism 20d. The ring gear 20r is provided so as to be rotatable around a rotation axis C1. The ring gear 20r is in mesh with an output gear 18a of the automatic transmission 18. The differential case 20c is fixed to the ring gear 20r. The differential gear mechanism 20d is accommodated in the differential case 20c. The front wheel driving force distribution unit 20 transmits driving force to the right and left axles 22R, 22L of the front wheels 14 while allowing differential rotation between the right and left axles 22R, 22L. Internal teeth 20a are provided on the differential case 20c. The internal teeth 20a are in mesh with first external spline teeth 34a. The first external spline teeth 34a are provided at one end of an input shaft 34. The input shaft 34 is provided in the transfer 26. With this configuration, part of driving force that is transmitted from the engine 12 to the right and left front wheels 14R, 14L via the differential case 20c is input to the transfer 26 via the input shaft 34.

The rear wheel driving force distribution unit 30 distributes driving force between the right and left rear wheels 16. As shown in FIG. 1, the rear wheel driving force distribution unit 30 includes a ring gear 40a of a cylindrical first rotating member 40, the second clutch 32 and a differential gear unit 42. The ring gear 40a is engaged with a drive pinion 38 so as to be relatively non-rotatable. The drive pinion 38 is coupled to one end of the propeller shaft 28 via a coupling 36. The second clutch 32 selectively couples the first rotating member 40 to a pair of axles 42R, 42L of the rear wheels 16. The differential gear unit 42 transmits power from the engine 12 while allowing appropriate differential rotation between the right and left axles 42R, 42L of the rear wheels 16. The power from the engine 12 is input via the second clutch 32.

As shown in FIG. 1, the differential gear unit 42 includes a differential case 42c, a pair of side gears 42a and a pair of pinions 42b. The differential case 42c is supported so as to be rotatable around a rotation axis C2. The pair of side gears 42a are respectively coupled to the pair of axles 42R, 42L of the rear wheels 16. The pair of side gears 42a are supported by the differential case 42c so as to be rotatable around the rotation axis C2 in a state where the pair of side gears 42a face each other inside the differential case 42c. The pair of pinions 42b are supported by the differential case 42c so as to be rotatable around a rotation axis C3 perpendicular to the rotation axis C2. The pair of pinions 42b are arranged between the pair of side gears 42a in a state where the pair of pinions 42b are in mesh with the pair of side gears 42a. Because the differential gear unit 42 is a known technique, the description of specific structure and operation is omitted.

As shown in FIG. 1, the coupling 36 is provided between the propeller shaft 28 and the first rotating member 40. The coupling 36 transmits torque between a rotating element 36a and a rotating element 36b. The coupling 36 is, for example, an electronically controlled coupling formed of a wet-type multiple disc clutch. By controlling the torque transmitted by the coupling 36, the coupling 36 is able to continuously change the distribution of torque between the front and rear wheels within the range of 100:0 to 50:50.

As shown in FIG. 1, the axle 42L extends through the radially inner side of the cylindrical first rotating member 40. The ring gear 40a is provided at an end across from the differential gear unit 42 side of the first rotating member 40. When the ring gear 40a is meshed with the drive pinion 38, the first rotating member 40 integrally rotates with the drive pinion 38. Clutch teeth 40b are provided at a differential gear unit 42-side end of the first rotating member 40. The clutch teeth 40b constitute part of the second clutch 32. Clutch teeth 42d are provided at a first rotating member 40-side end of the differential case 42c of the differential gear unit 42. The clutch teeth 42d constitute part of the second clutch 32.

The second clutch 32 is an intermesh clutch for selectively coupling the first rotating member 40 to the differential case 42c of the differential gear unit 42. That is, the second clutch 32 is an intermesh clutch for connecting the first rotating member 40 to the differential gear unit 42 or disconnecting the first rotating member 40 from the differential gear unit 42. The second clutch 32 is an intermesh dog clutch (disconnect mechanism). The second clutch 32 includes the clutch teeth 40b, the clutch teeth 42d, a sleeve 44 and a second clutch actuator 46. The clutch teeth 40b are provided on the first rotating member 40. The clutch teeth 42d are provided on the differential case 42c. The sleeve 44 has internal teeth 44a. The internal teeth 44a are meshable with those clutch teeth 40b and clutch teeth 42d. The sleeve 44 is provided so as to be movable in the rotation axis C2 direction. The second clutch actuator 46 actuates the sleeve 44 in the rotation axis C2 direction. The second clutch actuator 46 actuates the sleeve 44 in the rotation axis C2 direction in response to a command signal that is output from an electronic control unit (not shown). The second clutch 32 includes a known synchronizer 48. The synchronizer 48 synchronizes rotation of the first rotating member 40 with rotation of the differential case 42c before the internal teeth 44a of the sleeve 44 are meshed with the clutch teeth 40b of the first rotating member 40. In the two-wheel drive mode in which the first clutch 24 is released, the sleeve 44 is moved by the second clutch actuator 46 of the second clutch 32 to the differential gear unit 42 side as shown in FIG. 1. When the propeller shaft 28 is disconnected from the rear wheels 16L, 16R, that is, the first rotating member 40 is disconnected from the differential case 42c, the propeller shaft 28 is disconnected from the right and left rear wheels 16L, 16R. Thus, the running resistance of the vehicle due to the rotational resistance of the propeller shaft 28, and the like, is reduced. In the present embodiment, the second clutch 32 is an example of a disconnect mechanism.

Figure 2:
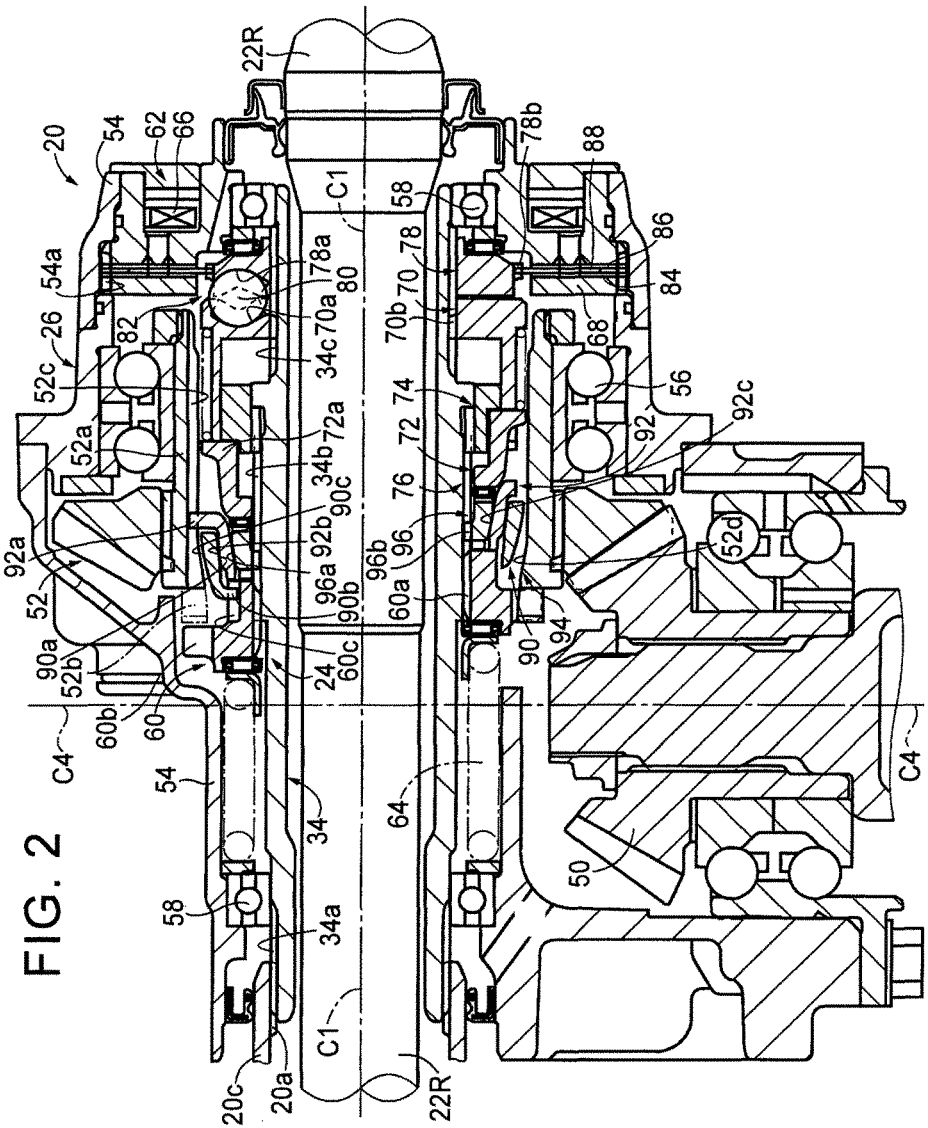
FIG. 2 is a cross-sectional view that illustrates the configuration of a transfer provided in the four-wheel drive vehicle shown in FIG. 1.

As shown in FIG. 1 and FIG. 2, the transfer 26 includes a ring gear 52, the cylindrical input shaft 34 and the first clutch 24. The ring gear 52 has a cylindrical shape. The ring gear 52 is in mesh with a driven pinion 50 in order to transmit power. The driven pinion 50 is coupled to the other end of the propeller shaft 28 in order to drive the propeller shaft 28. The cylindrical input shaft 34 receives part of driving force that is transmitted from the engine 12 to the front wheels 14R, 14L via the differential case 20c. The first clutch 24 connects the differential case 20c to the propeller shaft 28 or disconnects the differential case 20c from the propeller shaft 28 in a power transmission path from the differential case 20c to the propeller shaft 28. That is, the first clutch 24 connects the input shaft 34 coupled to the differential case 20c to the ring gear 52 coupled to the propeller shaft 28 or disconnects the input shaft 34 from the ring gear 52. The transfer 26 is configured such that part of driving force that is transmitted from the engine 12 to the right and left front wheels 14R, 14L is output to the right and left rear wheels 16R, 16L via the propeller shaft 28 when the input shaft 34 is connected to the ring gear 52 by engaging the first clutch 24.

Figure 3:
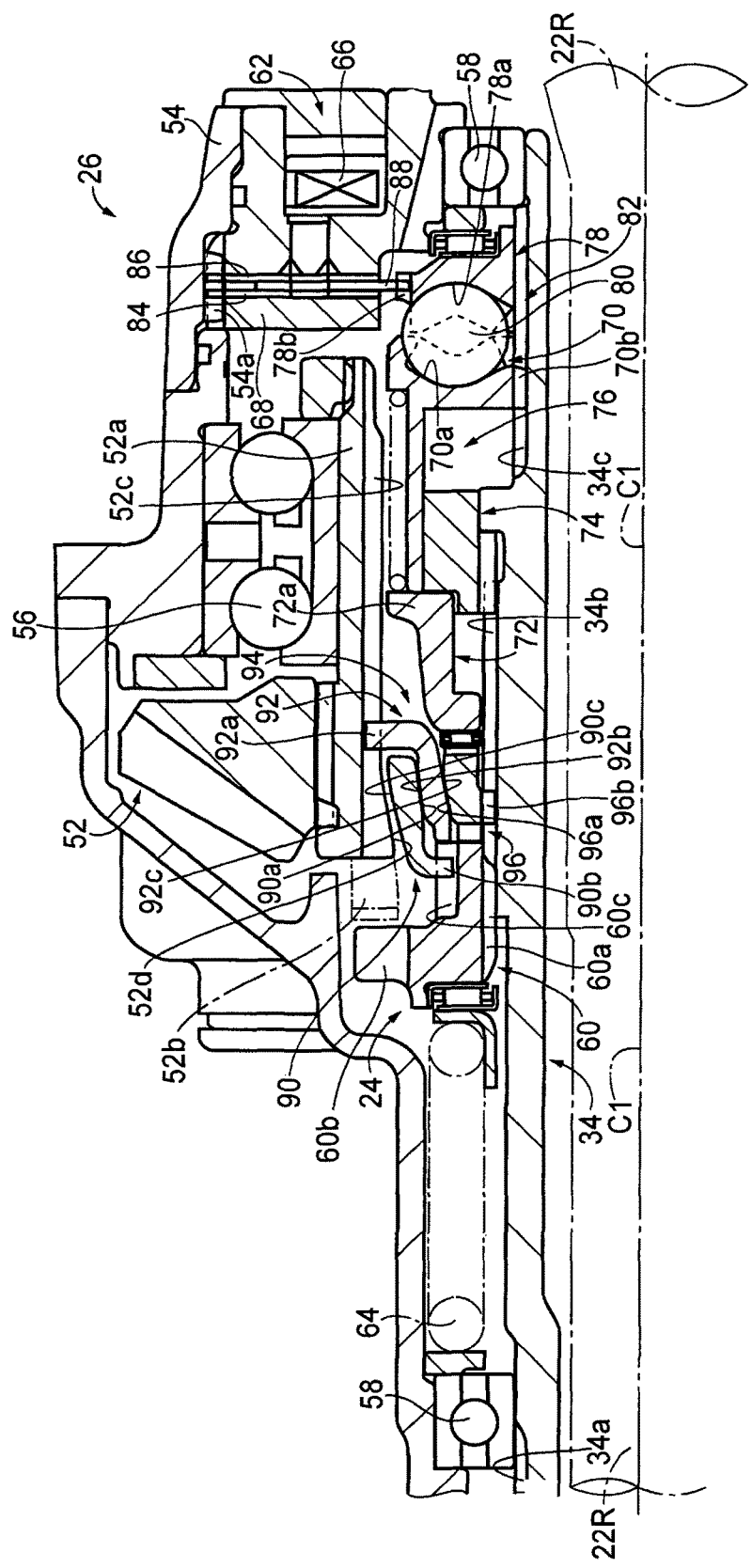
FIG. 3 is an enlarged view of FIG. 2, illustrating an intermesh disconnect mechanism provided in the transfer shown in FIG. 2.

As shown in FIG. 2 and FIG. 3, the cylindrical ring gear 52 is, for example, a bevel gear in which skew teeth or a hypoid gear is provided. The ring gear 52 has a shaft portion 52a. The shaft portion 52a protrudes in a substantially cylindrical shape from the inner peripheral portion of the ring gear 126 toward the front wheel 14R. The shaft portion 52a of the cylindrical ring gear 52 is supported by a bearing 56 provided in a unit case (case) 54. Thus, the ring gear 52 is supported in a cantilever manner so as to be rotatable around the rotation axis C1. As shown in FIG. 2 and FIG. 3, the cylindrical input shaft 34 extends through the inside of the cylindrical ring gear 52, and part of the input shaft 34 is arranged inside the ring gear 52. Both ends of the cylindrical input shaft 34 are supported by a pair of bearings 58 provided inside the unit case 54. Thus, the input shaft 34 is supported so as to be rotatable around the rotation axis C1. That is, the input shaft 34 is supported so as to be rotatable concentrically with the ring gear 52.

The first clutch 24 is an intermesh clutch for connecting the input shaft 34 of the transfer 26 to the ring gear 52 of the transfer 26 or disconnecting the input shaft 34 from the ring gear 52. The first clutch 24 is an intermesh dog clutch. As shown in FIG. 2 and FIG. 3, the first clutch 24 includes a movable sleeve (movable meshing member) 60, a first clutch actuator (actuator) 62, and the like. The movable sleeve 60 includes internal teeth 60a and external teeth (second teeth) 60b. The internal teeth 60a are constantly in mesh with second external spline teeth 34b so as to be movable in the rotation axis C1 direction. The second external spline teeth 34b are provided on the outer periphery of the center of the input shaft 34. The external teeth 60b are meshable with teeth (first teeth) 52b when the external teeth 60b move in the rotation axis C1 direction. The teeth 52b are provided on the front wheel 14L-side side face of the shaft portion 52a of the cylindrical ring gear 52. The first clutch actuator 62 is configured to move the movable sleeve 60 in the rotation axis C1 direction and change the movable sleeve 60 between a connection position and a disconnection position. At the connection position, the external teeth 60b mesh with the teeth 52b of the ring gear 52, with the result that the ring gear 52 is coupled to the input shaft 34 so as to be relatively non-rotatable. At the disconnection position, the external teeth 60b do not mesh with the teeth 52b of the ring gear 52, with the result that relative rotation between the ring gear 52 and the input shaft 34 is allowed. In the present embodiment, the teeth 52b of the ring gear 52 and the movable sleeve 60 are an example of an intermesh disconnect mechanism that connects the ring gear 52 to the input shaft 34 or disconnects the ring gear 52 from the input shaft 34. Part of the movable sleeve 60 of the intermesh disconnect mechanism is arranged in a space in the radial direction between the ring gear 52 and the input shaft 34 on the radially inner side of the cylindrical ring gear 52. That is, part of the movable sleeve 60 of the intermesh disconnect mechanism is arranged between the ring gear 52 and a portion of the input shaft 34. The portion of the input shaft 34 corresponds to the range of the length (axial length) of the ring gear 52 in the rotation axis C1 direction. The teeth 52b of the ring gear 52 of the first clutch 24 and the movable sleeve 60 of the first clutch 24, that is, the intermesh disconnect mechanism, is arranged inside the unit case 54 between the pair of bearings 58.

As shown in FIG. 2, the first clutch actuator 62 includes a ratchet mechanism (trip mechanism) 76 and an electromagnet 66 (described later). The ratchet mechanism 76 and the electromagnet 66 are arranged on the same side as the ring gear 52 with respect to the axis C4 of the propeller shaft 28. As shown in FIG. 2 and FIG. 3, the first clutch actuator 62 includes a spring 64. The spring 64 is arranged between the movable sleeve 60 and one of the pair of bearings 58, which is provided near the front wheel 14L. The spring 64 urges the movable sleeve 60 from the disconnection position toward the connection position. That is, the spring 64 urges the movable sleeve 60 toward the front wheel 14R in the rotation axis C1 direction. In addition, the first clutch actuator 62 includes the ratchet mechanism (trip mechanism) 76. The ratchet mechanism 76 includes an annular first piston 70, an annular second piston 72 and an annular holder 74. The annular first piston 70 is reciprocated in the rotation axis C1 direction by a predetermined stroke when the annular electromagnet 66 attracts a disc-shaped movable piece 68. The annular electromagnet 66 is provided inside the unit case 54. The annular second piston 72 is provided so as to be relatively rotatable with respect to the input shaft 34. The annular second piston 72 is moved by the first piston 70 in the rotation axis C1 direction against the urging force of the spring 64. The annular holder 74 has multi-step latch teeth 74a, 74b, 74c. The annular holder 74 is provided on the input shaft 34 so as to be relatively non-rotatable and non-movable in the rotation axis C1 direction. The annular holder 74 is configured to latch the second piston 72, moved by the first piston 70, with any one of the multi-step latch teeth 74a, 74b, 74c. The ratchet mechanism (trip mechanism) 76 causes the second piston 72 to move the movable sleeve 60 to the disconnection position against the urging force of the spring 64 by a predetermined number of times of reciprocating stroke of the first piston 70. When the number of times of reciprocating stroke exceeds the predetermined number of times, the ratchet mechanism (trip mechanism) 76 unlatches the second piston 72 and allows the movable sleeve 60 to move to the connection position under the urging force of the spring 64. The ratchet mechanism 76 is arranged on the radially inner side of the cylindrical ring gear 52, that is, on the radially inner side of the cylindrical shaft portion 52a of the ring gear 52, between the shaft portion 52a and the input shaft 34. The first clutch actuator 62 further includes a ball cam 82. The ball cam 82 includes an annular support member (annular member) 78 and spherical rolling elements 80. The support member 78 is arranged between the ratchet mechanism 76 and the electromagnet 66 in a state where the support member 78 overlaps with the first piston 70 of the ratchet mechanism 76 in the rotation axis C1 direction. Each of the spherical rolling elements 80 is sandwiched by a corresponding one of pairs of cam faces 70a, 78a respectively formed on mutually opposite faces of those support member 78 and first piston 70. In the ball cam 82, when those support member 78 and first piston 70 are relatively rotated, those support member 78 and first piston 70 are spaced apart from each other in the rotation axis C1 direction.

Thus, when the first piston 70 is reciprocated, for example, about once or twice toward the front wheel 14R and toward the front wheel 14L in the rotation axis C1 direction by the ball cam 82, the movable sleeve 60 is moved to the disconnection position via the ratchet mechanism 76 against the urging force of the spring 64, as shown on the upper side of the rotation axis C1, that is, the transfer 26 at the engine 12 side with respect to the rotation axis C1, in FIG. 2. Thus, meshing of the external teeth 60b of the movable sleeve 60 with the teeth 52b of the ring gear 52 is released, and the first clutch 24 is released. When the first piston 70 is reciprocated, for example, about three times by the ball cam 82, the second piston 72 is unlatched from the latch teeth 74b of the holder 74 in the ratchet mechanism 76, as shown on the lower side of the rotation axis C1, that is, the transfer 26 at a side across the rotation axis C1 from the engine 12 side, in FIG. 2. The movable sleeve 60 is moved to the connection position under the urging force of the spring 64, and the external teeth 60b of the movable sleeve 60 are meshed with the teeth 52b of the ring gear 52. Thus, the first clutch 24 is engaged. The fact that the first piston 70 is reciprocated, for example, about three times by the ball cam 82 means that, for example, the number of times of reciprocation of the first piston 70 exceeds the predetermined number of times.

As shown in FIG. 3 in detail, internal spline teeth 54a, a pair of disc-shaped clutch plates 84, 86, a disc-shaped clutch disc 88 and external spline teeth 78b of the support member 78 are provided between the electromagnet 66 and the ball cam 82. The internal spline teeth 54a are provided on the inner periphery of the electromagnet 66-side unit case 54. The pair of disc-shaped clutch plates 84, 86 are arranged between the electromagnet 66 and the movable piece 68. The pair of disc-shaped clutch plates 84, 86 are engaged with the internal spline teeth 54a of the unit case 54 so as to be relatively non-rotatable and movable in the rotation axis C1 direction. The disc-shaped clutch disc 88 is arranged between the pair of clutch plates 84, 86. The external spline teeth 78b of the support member 78 are engaged with the clutch disc 88 so as to be relatively non-rotatable and movable in the rotation axis C1 direction. The plurality of pairs of recessed groove-shaped cam faces 70a, 78a are formed at multiple positions in the circumferential direction between the annular first piston 70 and the annular support member 78. Each of the cam faces 70a, 78a is inclined such that the distance in the rotation axis C1 direction between the cam faces 70a, 78a decreases toward one of two sides in the circumferential direction. Each of the cam faces 70a, 78a shown in the cross-sectional view of FIG. 3 shows a state where the center distance between those cam faces 70a, 78a is longest. Internal teeth 70b are provided on the inner periphery of the front wheel 14R-side end of the first piston 70. The internal teeth 70b are in mesh with third external spline teeth 34c so as to be relatively non-rotatable and movable in the rotation axis C1 direction. The third external spline teeth 34c are provided on the outer periphery of the front wheel 14R-side end of the input shaft 34.

In the thus configured electromagnet 66 and ball cam 82, for example, when the input shaft 34 is rotating while the vehicle is traveling, and when the movable piece 68 is attracted by the electromagnet 66, the clutch disc 88 is clamped by the pair of clutch plates 84, 86 because of the movable piece 68, and braking torque is transmitted to the clutch disc 88. That is, when the movable piece 68 is attracted by the electromagnet 66, braking torque is transmitted to the support member 78 via the clutch disc 88. Therefore, relative rotation occurs between those support member 78 and the first piston 70 because of the braking torque, with the result that the first piston 70 moves toward the front wheel 14L in the rotation axis C1 direction with respect to the support member 78 via the spherical rolling elements 80. When the movable piece 68 is not attracted by the electromagnet 66, the support member 78 is relatively rotatable with respect to the unit case 54. Thus, the support member 78 co-rotates with the first piston 70 via the spherical rolling elements 80, and relative rotation does not occur between the support member 78 and the first piston 70, with the result that movement of the first piston 70 in the rotation axis C1 direction stops.

Figure 4:
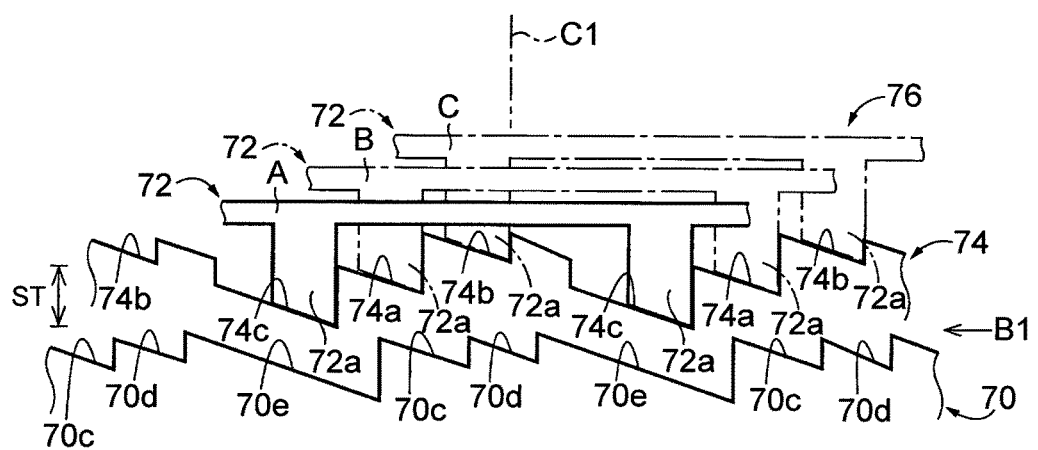
FIG. 4 is a view that illustrates a trip mechanism provided in the transfer shown in FIG. 2 in detail.

FIG. 4 is a schematic view that illustrates the operation principle of an example of the ratchet mechanism 76. FIG. 4 shows the annular first piston 70, the annular second piston 72 and the annular holder 74 in developed view. The ratchet mechanism 76 functions as a trip mechanism. The ratchet mechanism 76 includes the holder 74 and the first piston 70. The holder 74 periodically has the set of latch teeth 74a, 74b, 74c that are continuous in the circumferential direction. The latch teeth 74a, 74b, 74c are multi-step sawteeth for latching protrusions 72a. The protrusions 72a extend from the second piston 72 toward the holder 74. The holder 74 is fixed to the input shaft 34. The first piston 70 is provided so as to be relatively non-rotatable and relatively movable in the rotation axis C1 direction with respect to the holder 74. The first piston 70 periodically has a set of receiving teeth 70c, 70d, 70e. The receiving teeth 70c, 70d, 70e have similar sawtooth shapes to the latch teeth 74a, 74b, 74c of the holder 74. The receiving teeth 70c, 70d, 70e are continuous in the circumferential direction in a shape such that the latch teeth 74a, 74b, 74c of the holder 74 are shifted by a half phase in the circumferential direction. The first piston 70 moves the second piston 72 by one stroke of the ball cam 82 against the urging force of the spring 64. The three latch teeth 74a, 74b, 74c have different heights in the holder 74. The sets of three latch teeth 74a, 74b, 74c are provided so as to be close to the second piston 72 at a distance shorter than or equal to one stroke of the ball cam 82. The three receiving teeth 70c, 70d, 70e have different heights in the first piston 70. The three receiving teeth 70c, 70d, 70e have similar shapes to those of the latch teeth 74a, 74b, 74c. The three receiving teeth 70c, 70d, 70e are located so as to be shifted by a half phase in the circumferential direction with respect to the latch teeth 74a, 74b, 74c. In FIG. 4, the first piston 70 and the holder 74 are intentionally shifted from each other in the rotation axis C1 direction for the sake of easy understanding. In an initial state, as shown in FIG. 4, when the movable sleeve 60 is located at the connection position, the protrusions 72a extending from the second piston 72 are located at a position A at which the protrusions 72a are latched to the latch teeth 74c. In this initial state, the inclined faces of the receiving teeth 70e are substantially flush with the inclined faces of the latch teeth 74c. A stroke ST of the first piston 70 is indicated as a stroke from a base position B1 that is the lower end of the inclined face of each of the latch teeth 74c.

In the initial state, when the first piston 70 is reciprocated by the electromagnet 66 by the stroke ST for the first time, the protrusions 72a of the second piston 72 cross over the distal ends of the latch teeth 74a against the urging force of the spring 64 as a result of movement of the receiving teeth 70e of the first piston 70, slide onto the lowest ends of the inclined faces of the latch teeth 74a, and are latched at a position B. Subsequently, when the first piston 70 is reciprocated by the electromagnet 66 by the stroke ST for the second time, the protrusions 72a of the second piston 72 cross over the distal ends of the latch teeth 74b against the urging force of the spring 64 as a result of movement of the receiving teeth 70c of the first piston 70, slide onto the lowest ends of the inclined faces of the latch teeth 74b, and are latched at a position C. Subsequently, when the first piston 70 is reciprocated by the electromagnet 66 by the stroke ST for the third time, the protrusions 72a of the second piston 72 cross over the distal ends of the latch teeth 74c against the urging force of the spring 64 as a result of movement of the receiving teeth 70d of the first piston 70, slide onto the lowest ends of the inclined faces of the latch teeth 74c, and are latched to the latch teeth 74c. Thus, the protrusions 72a are returned to the same initial state as the position A. That is, when the first piston 70 is reciprocated by the electromagnet 66 via the ball cam 82 for the third time that corresponds to the predetermined number of times, the movable sleeve 60 is returned to the connection position. Thus, the external teeth 60b of the movable sleeve 60 are meshed with the teeth 52b of the ring gear 52, and the first clutch 24 is engaged.

Thus, the ratchet mechanism 76 sequentially moves the second piston 72 toward the disconnection position while shifting the second piston 72 in the circumferential direction one by one by a reciprocation of the first piston 70 by using the ball cam 82. When the number of times of movement of the second piston 72 reaches two, the second piston 72 is located at the disconnection position. In the ratchet mechanism 76, when the number of times of movement of the second piston 72 exceeds two and reaches three, the second piston 72 is unlatched from the latch teeth 74b of the holder 74, and the movable sleeve 60 moves to the connection position under the urging force of the spring 64.

As shown in FIG. 3, the first clutch actuator 62 includes a synchronizer 94. The synchronizer 94 synchronizes rotation of the input shaft 34 with rotation of the ring gear 52 when the movable sleeve 60 has moved to the most disconnection position side before the movable sleeve 60 is moved to the connection position. The synchronizer 94 is arranged between the movable sleeve 60 and the ratchet mechanism 76 on the radially inner side of the cylindrical ring gear 52, that is, on the radially inner side of the cylindrical shaft portion 52a of the ring gear 52.

As shown in FIG. 3, the synchronizer 94 includes an input shaft 34-side friction engagement member 90 and a ring gear 52-side friction engagement member 92. The friction engagement member 90 is provided on the input shaft 34 via the movable sleeve 60 so as to be relatively non-rotatable and movable in the rotation axis C1 direction. The friction engagement member 92 is provided on the ring gear 52 so as to be relatively non-rotatable and movable together with the movable sleeve 60 in the rotation axis C1 direction. The friction engagement member 92 includes external teeth 92a, a conical external friction face 92b and a conical internal contact face 92c. The external teeth 92a are in mesh with internal spline teeth 52c so as to be relatively non-rotatable and movable in the rotation axis C1 direction. The internal spline teeth 52c are provided on the inner periphery of the shaft portion 52a of the ring gear 52. The conical external friction face 92b is slidable on a conical internal friction face 90a. The conical internal friction face 90a is provided on the inner periphery of the input shaft 34-side friction engagement member 90, and is slightly inclined with respect to the rotation axis C1. The conical internal contact face 92c contacts a conical external contact face 96a. The conical external contact face 96a is provided on the outer periphery of an annular member 96, and is slightly inclined with respect to the rotation axis C1. The annular member 96 is interposed between the movable sleeve 60 and the second piston 72. Therefore, the friction engagement member 92 moves together with the movable sleeve 60 in the rotation axis C1 direction when the front wheel 14R-side end of the movable sleeve 60 is brought into contact with the front wheel 14L-side end of the friction engagement member 92 and the conical external contact face 96a of the annular member 96 is brought into contact with the conical internal contact face 92c of the ring gear 52-side friction engagement member 92. Internal teeth 96b are provided on the inner periphery of the annular member 96. The internal teeth 96b are in mesh with the second external spline teeth 34b of the input shaft 34 so as to be relatively non-rotatable and movable in the rotation axis C1 direction.

As shown in FIG. 3, the input shaft 34-side friction engagement member 90 includes the above-described conical internal friction face 90a, internal teeth 90b and a conical external contact face 90c. The internal teeth 90b are in mesh with external spline teeth 60c so as to be movable in the rotation axis C1 direction and relatively non-rotatable around the rotation axis C1. The external spline teeth 60c are provided on the outer periphery of the movable sleeve 60 so as to be relatively non-rotatable and movable in the rotation axis C1 direction with respect to the movable sleeve 60. The conical external contact face 90c is contactable with a conical internal contact face 52d. The conical internal contact face 52d is provided on the inner periphery of the front wheel 14L-side end of the shaft portion 52a of the ring gear 52, and is slightly inclined with respect to the rotation axis C1.

Therefore, when the movable sleeve 60 is changed from the disconnection position to the connection position via the annular member 96 and the ratchet mechanism 76, the conical external contact face 90c of the input shaft 34-side friction engagement member 90 is brought into contact with the conical internal contact face 52d of the ring gear 52 and the conical external friction face 92b of the ring gear 52-side friction engagement member 92 is pressed against the conical internal friction face 90a of the input shaft 34-side friction engagement member 90 before the teeth 52b of the ring gear 52 mesh with the external teeth 60b of the movable sleeve 60. Thus, rotation of the ring gear 52 that is engaged with the ring gear 52-side friction engagement member 92 so as to be relatively non-rotatable is synchronized with rotation of the input shaft 34 that is engaged with the input shaft 34-side friction engagement member 90 via the movable sleeve 60 so as to be relatively non-rotatable. The positions, shapes and dimensions of the input shaft 34-side friction engagement member 90 and ring gear 52 are set such that, when the second piston 72 and the movable sleeve 60 are moved toward a side closest to the front wheel 14L in process in which the number of times of attraction operation of the movable piece 68 by using the electromagnet 66 exceeds the predetermined number of times, the conical external contact face 90c and the conical internal contact face 52d contact each other. In the synchronizer 94, the stroke ST of the movable sleeve 60 in the rotation axis C1 direction is suitably longer owing to the ball cam 82 than that of, for example, a configuration that the movable sleeve 60 is reciprocated by attracting the movable piece 68 by using the electromagnet 66. That is, the stroke ST of the movable sleeve 60 in the rotation axis C1 direction by using the ball cam 82 is the stroke ST of the ring gear 52-side friction engagement member 92 in the rotation axis C1 direction. Thus, for example, even when the ring gear 52-side friction engagement member 92 and the input shaft 34-side friction engagement member 90 have abraded, it is possible to press the ring gear 52-side friction engagement member 92 against the input shaft 34-side friction engagement member 90. Thus, it is possible to suitably synchronize rotation of the ring gear 52 with rotation of the input shaft 34.

In the thus configured four-wheel drive vehicle 10, for example, in the four-wheel drive mode in which the first clutch 24 and the second clutch 32 both are engaged, when the electronic control unit (not shown) selects a two-wheel drive traveling mode, the movable sleeve 60 is moved to the disconnection position by the first clutch actuator 62 in the transfer 26, and the sleeve 44 is moved to a non-meshed position by the second clutch actuator 46. Thus, the first clutch 24 is released, and the second clutch 32 is released. Thus, the vehicle is in the two-wheel drive mode in which driving force is transmitted from the engine 12 to only the front wheels 14 that are the main drive wheels. In the two-wheel drive mode in which the first clutch 24 and the second clutch 32 both are released, when the electronic control unit (not shown) selects a four-wheel drive traveling mode, the movable sleeve 60 is moved to the connection position by the first clutch actuator 62 in the transfer 26, and the sleeve 44 is moved to a meshed position by the second clutch actuator 46. Thus, the first clutch 24 is engaged, and the second clutch 32 is engaged. Thus, the vehicle is in the four-wheel drive mode in which driving force is transmitted from the engine 12 to the front wheels 14 and the rear wheels 16.

As described above, with the transfer 26 for the four-wheel drive vehicle 10 according to the present embodiment, the input shaft 34 extends through the inside of the ring gear 52 and is supported so as to be rotatable concentrically with the ring gear 52. Thus, the rotation axis C1 of the input shaft 34 and the rotation axis C1 of the ring gear 52 are suitably close to each other. The size of the transfer 26 in a direction perpendicular to the rotation axis C1 of the ring gear 52 is suitably reduced. Therefore, it is possible to reduce the size of the transfer 26 as compared to an existing transfer.

With the transfer 26 for the four-wheel drive vehicle 10 according to the present embodiment, both ends of the input shaft 34 are supported by the pair of bearings 58 provided inside the unit case 54. Thus, the input shaft 34 is supported so as to be rotatable concentrically with the ring gear 52. The movable sleeve 60 of the first clutch 24 and the teeth 52b of the ring gear 52, that is, the intermesh disconnect mechanism, is arranged between the pair of bearings 58. Therefore, the arrangement position of the intermesh disconnect mechanism in the direction of the rotation axis C1 of the ring gear 52 is determined in the transfer 26, and the size of the transfer 26 in the direction of the rotation axis C1 of the ring gear 52 is reduced.

With the transfer 26 for the four-wheel drive vehicle 10 according to the present embodiment, the power transmission member that transmits power toward the rear wheels 16R, 16L is the propeller shaft 28. The first clutch actuator 62 includes the ratchet mechanism 76 and the electromagnet 66. The ratchet mechanism 76 and the electromagnet 66 change the movable sleeve 60 between the connection position and the disconnection position. Those ratchet mechanism 76 and electromagnet 66 are arranged on the same side as the ring gear 52 with respect to the axis C4 of the propeller shaft 28. Therefore, the arrangement positions of the ratchet mechanism 76 and electromagnet 66 of the first clutch actuator 62 in the transfer 26 are suitably close to the ring gear 52. Thus, the size of the transfer 26 in the rotation axis C1 direction is suitably reduced, so it is possible to reduce the size of the transfer 26.

With the transfer 26 for the four-wheel drive vehicle 10 according to the present embodiment, the disconnect mechanism that connects or interrupts the power transmission path between the ring gear 52 and the input shaft 34 is the intermesh disconnect mechanism including the teeth 52b and the movable sleeve 60. The teeth 52b are provided on the ring gear 52. The movable sleeve 60 has the external teeth 60b that are engageable with the teeth 52b, and is provided on the input shaft 34 so as to be relatively non-rotatable and movable in the rotation axis C1 direction. The first clutch actuator 62 moves the movable sleeve 60 to the connection position or to the disconnection position by the electromagnet 66. Therefore, for example, in comparison with a configuration that a controlled coupling is provided between the ring gear 52 and the input shaft 34, co-rotation of the ring gear 52 resulting from rotation of the input shaft 34 is prevented when the movable sleeve 60 has been moved to the disconnection position by the first clutch actuator 62.

With the transfer 26 for the four-wheel drive vehicle 10 according to the present embodiment, the first clutch actuator 62 includes the spring 64 and the ratchet mechanism 76. The spring 64 urges the movable sleeve 60 from the disconnection position toward the connection position. The ratchet mechanism 76 includes the first piston 70, the second piston 72 and the holder 74. The first piston 70 is reciprocated by the electromagnet 66 in the rotation axis C1 direction by the predetermined stroke. The second piston 72 is provided so as to be relatively rotatable with respect to the input shaft 34. The second piston 72 is moved by the first piston 70 against the urging force of the spring 64. The holder 74 has the multi-step latch teeth 74a, 74b, 74c. The holder 74 is provided on the input shaft 34 so as to be relatively non-rotatable and non-movable in the rotation axis C1 direction. The holder 74 is configured to latch the second piston 72, moved by the first piston 70, with any one of the multi-step latch teeth 74a, 74b, 74c. The ratchet mechanism 76 causes the second piston 72 to move the movable sleeve 60 to the disconnection position against the urging force of the spring 64 by the predetermined number of times of reciprocation stroke of the first piston 70. When the number of times of reciprocation stroke exceeds the predetermined number of times, the ratchet mechanism 76 unlatches the second piston 72 and allows the movable sleeve 60 to move to the connection position under the urging force of the spring 64. Therefore, when the second piston 72 is latched to the latch teeth 74a, 74b, 74c of the holder 74 by the ratchet mechanism 76, it is possible to mechanically position the movable sleeve 60 at the disconnection position or at the connection position and fix the position of the movable sleeve 60. Thus, for example, in comparison with a configuration that electric power is used to fix the position of the movable sleeve 60 at the disconnection position or at the connection position, it is possible to suitably suppress an electric power consumption that is used in the transfer 26.

With the transfer 26 for the four-wheel drive vehicle 10 according to the present embodiment, the ball cam 82 is arranged between the electromagnet 66 and the ratchet mechanism 76. The ball cam 82 includes the annular support member 78 and the spherical rolling elements 80. The annular support member 78 is arranged in a state where the support member 78 overlaps with the first piston 70 of the ratchet mechanism 76 in the rotation axis C1 direction. Each of the spherical rolling elements 80 is sandwiched by a corresponding one of the pairs of cam faces 70a, 78a respectively formed on mutually opposite faces of those support member 78 and first piston 70. In the ball cam 82, when those support member 78 and first piston 70 are relatively rotated, those support member 78 and first piston 70 are spaced apart from each other. When braking torque is transmitted to the support member 78 by the electromagnet 66 and then those support member 78 and first piston 70 relatively rotate, the movable sleeve 60 is moved in the rotation axis C1 direction by the ball cam 82 via the ratchet mechanism 76. Therefore, for example, in comparison with a configuration that the movable sleeve 60 is reciprocated by the predetermined stroke by attracting the movable piece 68 by using the electromagnet 66, it is possible to suitably elongate the stroke of the movable sleeve 60 by using the ball cam 82.

With the transfer 26 for the four-wheel drive vehicle 10 according to the present embodiment, the synchronizer 94 is arranged between the movable sleeve 60 and the ratchet mechanism 76 on the radially inner side of the ring gear 52. The synchronizer 94 includes the input shaft 34-side friction engagement member 90 and the ring gear 52-side friction engagement member 92. The friction engagement member 90 is provided on the input shaft 34 so as to be relatively non-rotatable. The friction engagement member 92 is provided on the ring gear 52 so as to be relatively non-rotatable and movable together with the movable sleeve 60 in the rotation axis C1 direction. The synchronizer 94 synchronizes rotation of the input shaft 34 with rotation of the ring gear 52 when the ring gear 52-side friction engagement member 92 is pressed against the input shaft 34-side friction engagement member 90 and the input shaft 34-side friction engagement member 90 and the ring gear 52-side friction engagement member 92 are caused to slide on each other before the movable sleeve 60 is moved to the connection position. Therefore, because the synchronizer 94 is arranged between the movable sleeve 60 and the ratchet mechanism 76 on the radially inner side of the cylindrical ring gear 52, it is possible to suitably reduce the size of the transfer 26 in the direction of the rotation axis C1 of the ring gear 52.

With the transfer 26 for the four-wheel drive vehicle 10 according to the present embodiment, part of the movable sleeve 60 is arranged between the ring gear 52 and a portion of the input shaft 34. The portion of the input shaft 34 corresponds to the range of the length of the ring gear 52 in the rotation axis C1 direction. Thus, the size of the transfer 26 in the direction of the rotation axis C1 of the ring gear 52 is suitably reduced.

The embodiment of the invention is described in detail with reference to the accompanying drawings. The invention is also applied to other embodiments.

For example, the four-wheel drive vehicle 10 according to the above-described embodiment is the FF-base vehicle in which the front wheel driving force distribution unit 20 including the transfer 26 is provided. The invention is also applicable to an FR-base four-wheel drive vehicle, an RR-base four-wheel drive vehicle, or the like, as needed. In the FR-base four-wheel drive vehicle or the RR-base four-wheel drive vehicle, a rear wheel driving force distribution unit having a substantially similar configuration to that of the front wheel driving force distribution unit 20 is used for the rear wheels. In the above-described embodiment, the first clutch 24 is formed of the intermesh disconnect mechanism including the movable sleeve 60, and the like. The first clutch 24 may be formed of a mechanism other than the intermesh disconnect mechanism. For example, the first clutch 24 may be formed of a multiple disc friction clutch, or the like.

In the four-wheel drive vehicle 10 according to the above-described embodiment, the first clutch actuator 62 for operating the first clutch 24 includes the electromagnet 66, the ball cam 82 and the ratchet mechanism 76. The ball cam 82 and the ratchet mechanism 76 are used to operate the second piston 72 by a stroke larger than the operation stroke of the movable piece 68 by the electromagnet 66. Instead, an electromagnetic actuator having a large operation stroke, a motor, a hydraulic cylinder, or the like, may be used to move the second piston 72. In this case, the ball cam 82 and the ratchet mechanism 76 are unnecessary. In the ratchet mechanism 76, the number of steps of the receiving teeth 70c, 70d, 70e of the first piston 70 and the number of steps of the latch teeth 74a, 74b, 74c of the holder 74 are three. For example, in the ratchet mechanism 76, the number of steps of the receiving teeth 70c, 70d, 70e of the first piston 70 and the number of steps of the latch teeth 74a, 74b, 74c of the holder 74 may be two or four or more. When the vehicle travels at a sufficient vehicle speed (not an extremely low vehicle speed, or the like), a vehicle speed (rotational difference)-sensitive disconnect mechanism that changes a connected state between the input shaft 34 of the transfer 26 and the ring gear 52 of the transfer 26 in response to relative rotation between the first piston 70 and the support member 78 by using the ball cam 82, the ratchet mechanism 76, and the like, as in the case of the present embodiment is higher in responsiveness than, for example, a motor disconnect mechanism that changes a connected state between the input shaft 34 of the transfer 26 and the ring gear 52 of the transfer 26 by driving a motor. That is, the rate of change at which a connected state between the input shaft 34 of the transfer 26 and the ring gear 52 of the transfer 26 is changed is high.

In the four-wheel drive vehicle 10 according to the above-described embodiment, part of the movable sleeve 60 is arranged on the radially inner side of the cylindrical ring gear 52. The whole of the movable sleeve 60 may be arranged on the radially inner side of the cylindrical ring gear 52. The teeth 52*b* that are in mesh with the external teeth 60*b* of the movable sleeve 60 are provided at the front wheel 14L-side end of the shaft portion 52*a* of the ring gear 52. For example, the teeth 52*b* may be provided on the radially inner side of the shaft portion 52*a* of the ring gear 52. That is, as long as the movable sleeve 60 meshes with the ring gear 52 so as to be relatively non-rotatable at the time when the movable sleeve 60 has been moved to the connection position, the external teeth 60*b* provided on the movable sleeve 60 or the teeth 52*b* of the ring gear 52 may be provided at any position. The whole of the movable sleeve 60 may be arranged not on the radially inner side of the cylindrical ring gear 52 by shifting the meshing position of the external teeth 60*b* of the movable sleeve 60 with the teeth 52*b* of the ring gear 52 in a direction away from the ring gear 52. That is, the movable sleeve 60 may be arranged not between the cylindrical ring gear 52 and the input shaft 34.

The above-described embodiments are only illustrative. The invention may be implemented in a mode including various modifications or improvements on the basis of the knowledge of persons skilled in the art.

What is claimed is:

1. A transfer for a four-wheel drive vehicle, the four-wheel drive vehicle including a driving source, right and left main drive wheels, a power transmission member, and right and left auxiliary drive wheels, the transfer being configured to output part of driving force, which is transmitted from the driving source to the main drive wheels, to the auxiliary drive wheels via the power transmission member when a drive mode of the four-wheel drive vehicle has been changed from a two-wheel drive mode to a four-wheel drive mode, the transfer comprising:
    a ring gear having a cylindrical shape, the ring gear being supported so as to rotate around a rotation axis, and configured to drive the power transmission member;
    an input shaft extending through an inside of the ring gear, the input shaft being supported so as to rotate concentrically with the ring gear and, configured to receive part of the driving force that is transmitted from the driving source to the main drive wheels;
    a disconnect mechanism configured to connect the ring gear to the input shaft and disconnect the ring gear from the input shaft, wherein
        the disconnect mechanism is an intermesh disconnect mechanism and includes first teeth and a movable meshing member, wherein the first teeth are provided on the ring gear, wherein the movable meshing member includes second teeth configured to be engaged with or released from the first teeth, and wherein the movable meshing member is provided on the input shaft so as not to relatively rotate and so as to move in a direction of the rotation axis; and
    an actuator configured to change the disconnect mechanism between a connection position and a disconnection position, the connection position being a position at which the ring gear and the input shaft are coupled to each other so as not to relatively rotate, the disconnection position being a position at which relative rotation between the ring gear and the input shaft is allowed, wherein
        the actuator is configured to move the movable meshing member between the connection position and the disconnection position by using an electromagnet
    the actuator includes a trip mechanism, the electromagnet and a spring, wherein the trip mechanism and the electromagnet are configured to change the disconnect mechanism between the connection position and the disconnection position, wherein the spring is configured to urge the movable meshing member from the disconnection position toward the connection position, wherein
    the trip mechanism includes a first piston, a second piston and a holder, wherein
        the first piston is configured to be reciprocated by the electromagnet in the direction of the rotation axis by a predetermined stroke,
        the second piston is provided so as to relatively rotate with respect to the input shaft and is moved by the first piston against an urging force of the spring, and
        the holder has multi-step latch teeth and is provided on the input shaft so as not to relatively rotate or move in the direction of the rotation axis, the holder is configured to latch the second piston, moved by the first piston, with any one of the multi-step latch teeth,
    wherein the trip mechanism is configured to cause the second piston to move the movable meshing member to the disconnection position against the urging force of the spring by a predetermined number of times of reciprocating stroke of the first piston, and
    the trip mechanism is configured to, when the number of times of reciprocating stroke exceeds the predetermined number of times, unlatch the second piston and allow the movable meshing member to move to the connection position under the urging force of the spring.

2. The transfer according to claim 1, wherein
both ends of the input shaft are supported by a pair of bearings provided inside a case such that the input shaft rotates concentrically with the ring gear, and
the disconnect mechanism is arranged between the pair of bearings.

3. The transfer according to claim 1, wherein
the power transmission member is a propeller shaft configured to transmit power toward the auxiliary drive wheels, and
the trip mechanism and the electromagnet are arranged on the same side as the ring gear with respect to an axis of the propeller shaft.

4. The transfer according to claim 1, further comprising:
a ball cam arranged between the electromagnet and the trip mechanism,
the ball cam including an annular member and spherical rolling elements,
the annular member being arranged in a state where the annular member overlaps with the first piston of the trip mechanism in the direction of the rotation axis,
the spherical rolling elements being sandwiched by a pair of mutually facing cam faces respectively formed on the annular member and the first piston,
the ball cam being configured to space the annular member and the first piston apart from each other when the annular member and the first piston are relatively rotated, wherein
the movable meshing member is configured to be moved in the direction of the rotation axis by the ball cam via the trip mechanism when braking torque is transmitted to the annular member by the electromagnet and then the annular member and the first piston relatively rotate.

5. The transfer according to claim 1, further comprising:
a synchronizer arranged between the movable meshing member and the trip mechanism inside the ring gear,
the synchronizer including an input shaft-side friction engagement member and a ring gear-side friction engagement member,
the input shaft-side friction engagement member being provided on the input shaft so as not to relatively rotate,
the ring gear-side friction engagement member being provided on the ring gear so as not to relatively rotate and so as to move in the direction of the rotation axis together with the movable meshing member,
the synchronizer being configured to synchronize rotation of the ring gear with rotation of the input shaft by causing the input shaft-side friction engagement member and the ring gear-side friction engagement member to be in sliding contact with each other before the movable meshing member is moved to the connection position.

6. The transfer according to claim 1, wherein
part of the movable meshing member is arranged between the ring gear and a portion of the input shaft, and the portion of the input shaft corresponds to a range of an axial length of the ring gear.

* * * * *